US005708345A

United States Patent [19]

Kramer et al.

[11] Patent Number: 5,708,345

[45] Date of Patent: Jan. 13, 1998

[54] COMPACT SHEET CUTTER FOR A DOCUMENT REPRODUCTION MACHINE

[75] Inventors: William E. Kramer, Wolcott; Michael J. Tracy, Hilton, both of N.Y.; John L. Webb, Green Cove Springs, Fla.

[73] Assignee: Xerox Corporation, Stamford, Conn.

[21] Appl. No.: 632,775

[22] Filed: Apr. 15, 1996

Related U.S. Application Data

[63] Continuation of Ser. No. 345,032, Nov. 25, 1994, abandoned.

[51] Int. Cl.⁶ ........ H02P 8/00

[52] U.S. Cl. ........ 318/696; 355/29; 399/385; 83/110; 271/258.01

[58] Field of Search ........ 399/380–385, 399/388–390; 318/685, 696, 280–300; 271/256, 258.01; 358/304; 355/28, 29; 83/110, 109, 287–288

[56] References Cited

U.S. PATENT DOCUMENTS

| | | | |
|---|---|---|---|
| 3,639,053 | 2/1972 | Spear, Jr. | 355/13 |
| 3,727,499 | 4/1973 | Boston | 83/205 |
| 3,815,457 | 6/1974 | Shmmin | 95/94 R |
| 4,821,974 | 4/1989 | Poehlein | 242/68.4 |
| 4,928,141 | 5/1990 | Poehlein et al. | 355/208 |
| 4,996,556 | 2/1991 | Gray | 355/50 |
| 5,040,777 | 8/1991 | Bell et al. | 271/3 |
| 5,184,533 | 2/1993 | Golicz | 83/24 |
| 5,257,567 | 11/1993 | Walker et al. | 83/74 |

*Primary Examiner*—David S. Martin

[57] ABSTRACT

A compact sheet feeding and cutting apparatus is disclosed which is particularly suitable for retrofitting to an existing document reproduction machine. The sheet feeding and cutting components are located within a common housing which can be mechanically attached to an existing machine. In one embodiment, no electrical connections are required between the reproduction machine and the feeding and cutting apparatus. A sheet cutting length is entered into local memory and controls the operation of a dc stepper motor in a sheet cutting mode and a sheet feeding mode. The motor is reversed and operates in a sheet feeding mode to drive feed rollers causing the sheet to unroll from a supply roll. The motor is operatively connected to the drive feed rollers and to the sheet cutter through separate, one-way clutches. The sheet is fed from the roll at a faster speed than the speed of sheet travel within the reproduction machine as it advances to a transfer station. This speed mismatch periodically creates a buckle in the moving sheet which contacts a switch causing it to open and close. The switch thus controls an on/off operation of the motor changing it from a sheet feeding mode into a sheet cutting mode.

2 Claims, 3 Drawing Sheets

COMPACT SHEET CUTTER FOR A DOCUMENT REPRODUCTION MACHINE

This is a continuation, of application Ser. No. 08/345,032, filed Nov. 25, 1994, now abandoned.

BACKGROUND AND MATERIAL DISCLOSURE STATEMENT

This invention relates to a document reproduction machine and, more particularly, to a sheet cutting apparatus for supplying cut sheets to receive developed and transferred images of the documents being copied.

Copying relatively large size documents such as engineering drawings and the like normally requires that the copy sheet material be supplied from a roll assembly. As a result, it is necessary that the sheet material be cut to size from the roll being used, and for this purpose, a cut sheet roll supply is desirable. Typically, a cut sheet roll supply of the type referred to herein includes a roll support which holds and permits the roll to be unwound as sheets are cut therefrom, and a sheet cutter such as a rotary cutter which cuts or severs the sheet material in two. Also conventional is a sheet handling apparatus for unwinding the sheet material from the supply roll and advancing a length selected to the sheet cutter, and a machine control system for integrating and synchronizing operation of the various components.

Various sheet cutting apparatus are known in the art. U.S. Pat. No. 3,639,053, discloses a conventional guillotine type of cutter. Rotary-type cutters are disclosed in U.S. Pat. Nos. 3,727,499 and 5,257,567. In these prior art cutting devices two separate dedicated drive means are used to feed the sheets from a roll and to provide the on-demand cutting action of the cutting blade. The drive means typically used are dc servo motors. It is one object of the present invention to eliminate the need for two separate drive means by using a single dc stepper motor to perform the sheet feeding and cutting functions.

It is a further object to provide a compact sheet cutter which can be easily retrofitted to an existing machine and which requires only a mechanical connection to the machine frame.

The objects of the invention are realized by providing a compact sheet cutting apparatus which comprises a sheet supply roll, feed rollers, a sheet cutter, a stepper motor to power both the sheet cutter and the feed rolls and a paper guide. The sheet cutting apparatus, in one embodiment, contains an independent power system not requiring electrical connections to the main copying machine. The apparatus is easily connected to the main machine. More particularly, the invention relates to a document reproduction machine including a photoconductive member moving at a predetermined speed V1, a charging station for placing uniform charge on the surface of said photoconductive member, an exposure station for forming an electrostatic latent image on the surface of said photoconductive member, a developing station for developing said electrostatic images with toner particles, a transfer station for transferring the developed image to a copy sheet in registration therewith, a fusing station to fuse said transferred image, controller means for controlling timing operations of said xerographic stations, and an improved sheet cutter and sheet cutting means including a sheet supply roll, a sheet cutter, feeding means for advancing the sheet from said supply roll at a speed V2 greater than said speed V1 through said sheet cutter and into said transfer station, means for pre-selecting a length of sheet to be cut by said sheet cutter, means for controlling the operation of said feeding means and for activating the sheet cutter to cut the advanced sheet to the preselected length and wherein said sheet feeding means and said sheet cutter are operated by a single drive means.

DESCRIPTION OF THE INVENTION

The cutting apparatus described herein can operate independently to sever individual sheets from a web material or, in the alternative, can be employed as a component of a larger system wherein web material is cut into individual sheets before being fed into a copier system. Since the invention adapts itself very well to supply individual sheets to a large document copier system, it is described within this environment.

Figure 1:
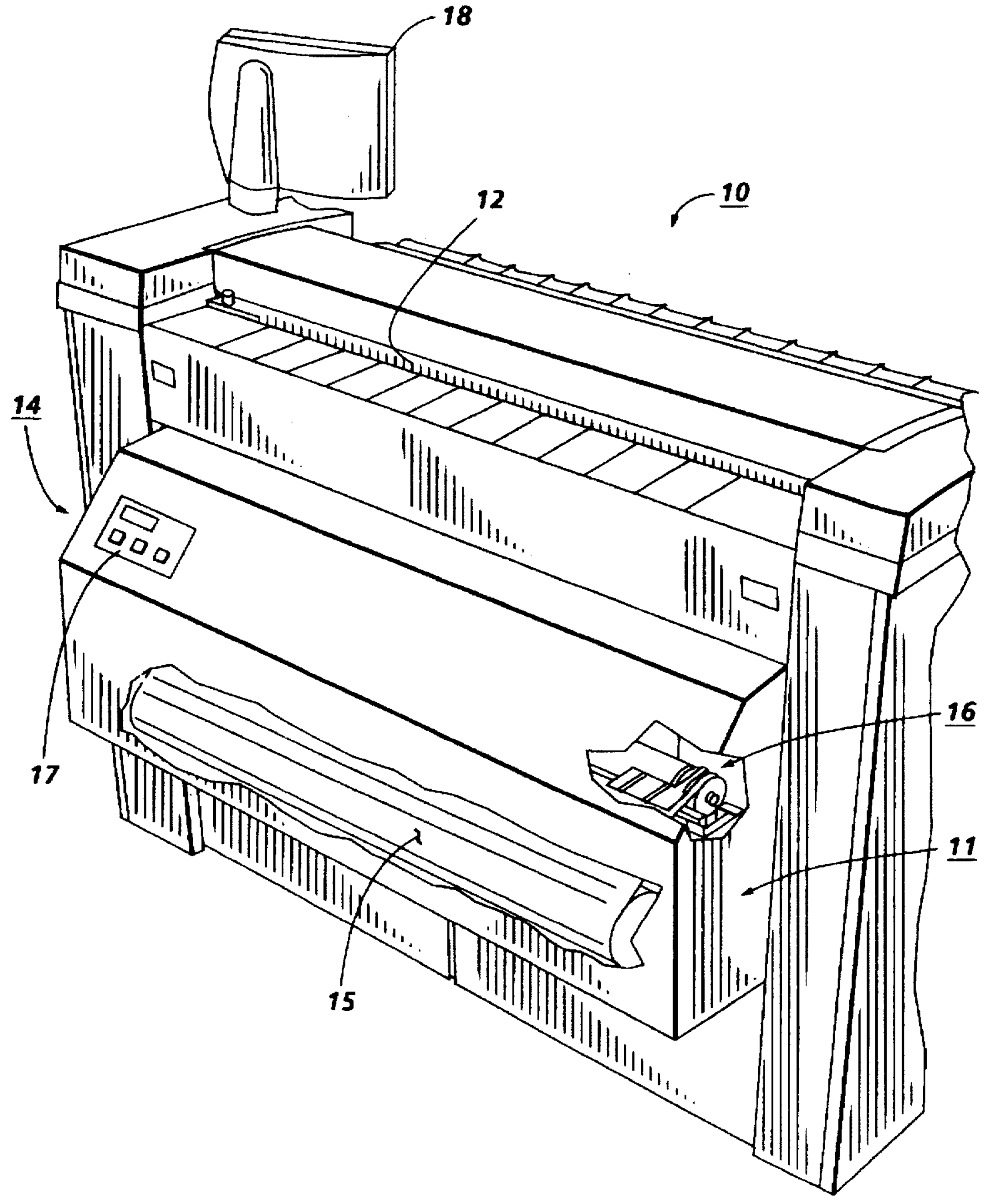
FIG. 1 is a perspective view of a large document reproduction machine incorporating the sheet cutter apparatus of the present invention.

Referring to FIG. 1, there is shown in rear view perspective, a large document reproduction machine 10. Documents to be copied are fed in from the front of the machine, pass through an exposure zone and exit via slot 12. A sheet roll and cutter assembly 14 is attached to the base of the machine frame 11, where a sheet feed roll 15 and sheet cutter 16 are located. A control panel 17 on assembly 14, or a panel 18 on machine 10, is provided to select operating sheet parameters.

Figure 2:
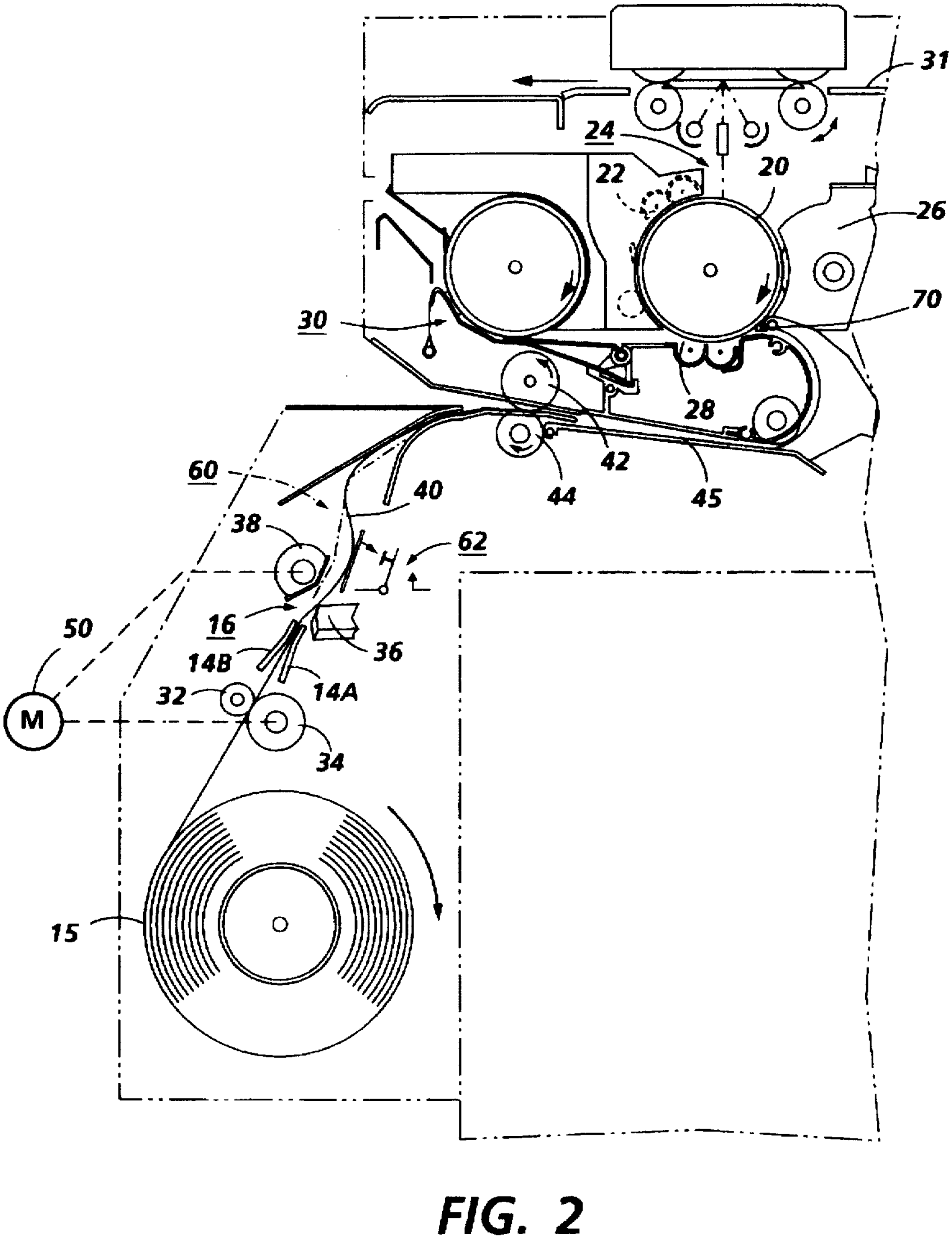
FIG. 2 is a side schematic view of the reproduction machine of FIG. 1.

FIG. 2 shows a side internal view of the machine as including an electrostatic drum with xerographic stations arranged about its periphery to carry out the operational steps of the copying process. These stations include charging station 22, exposure station 24, developing station 26, transfer station 28, and fusing station 30. Documents fed along a platen 31 in the direction of the arrow are imaged onto the surface of drum 20, at exposure station 24. The operation of each station is conventional and is described, for example, in U.S. Pat. Nos. 4,821,974, 4,996,556 and 5,040,777, whose contents are hereby incorporated by reference.

A copy media, which may be bond paper, vellum, or the like, is fed from a media feed roll 15 and is fed therefrom by a supply feed roller pair 32, 34, between sheet guides 14A, 14B and into the sheet cutter 16. The sheet cutter 16 comprises a stationary blade 36 and a rotating cutter bar 38, having a helical cutting blade. Cutter bar 38 is shown in FIG. 2 in the home position, which is about 30 degrees of rotation away from the cutting position. Cutter 16 is of the type described, for example, in U.S. Pat. No. 4,058,037, whose contents are hereby incorporated by reference. Initiated by a cutter operation signal, described in greater detail below, bar 38 rotates in the direction of the arrow with blade 36 moving against the helical blade to shear the sheet with a straight cut A cut sheet 40 is transferred by machine feed roller pairs 42, 44 into baffle pair 45 and then into transfer station 28 where a previously developed image is transferred onto the cut sheet 40. The transferred image is then fed to fuser station 30 where the transferred image is fused. The cut sheets are then conveyed onto an output tray (not shown).

According to a first aspect of the invention, a single motor 50, a reversible dc stepper motor in this embodiment, is connected by separate one-way clutches 52, 54 (FIG. 3) to the feeder roll 34 and to cutter 16 via a drive belt 56. The motor is activated to control the feeding of media from supply roll 15 until a programmed length of paper, equivalent to the document length being copied, is fed out The sheets are fed out from supply roll 15 at a faster rate than the process speed, e.g., at a rate faster than the rotational speed of drum 20. This speed mismatch results in the formation of a buckle 60 shown in FIG. 2. The formation of buckle 60 opens and closes a control switch 62 which controls the operation of motor 50.

Figure 3:
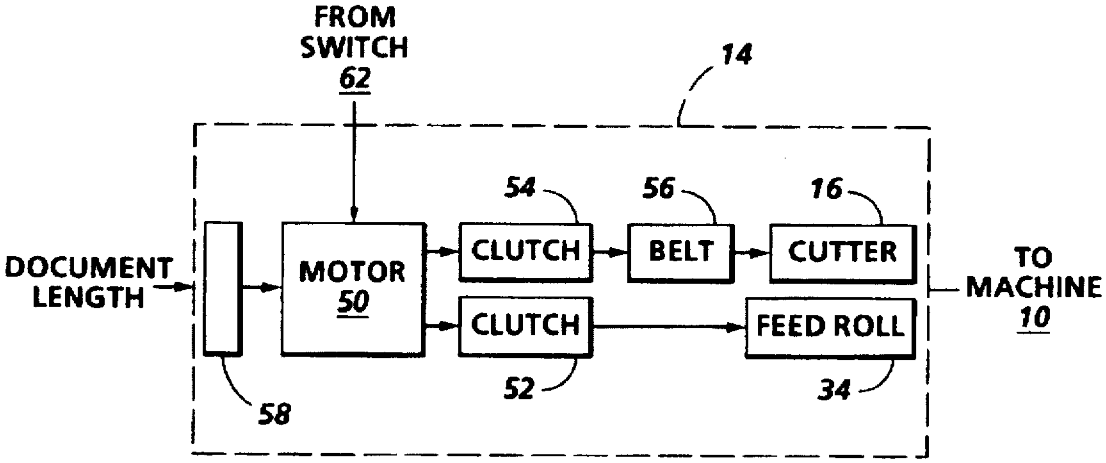
FIG. 3 is a block diagram of the control circuitry for operating the sheet cutter apparatus.

In operation, and when cutter assembly is operating independently, selections are made by an operator at control panel 17 on assembly 14 to select the cut sheet length to the width of the input document length being copied. This value is entered into memory 58 (FIG. 3). When the length selection has been made, a PRINT cycle is initiated at panel 18. Motor 50 is energized and drives feed roller pairs 32, 34 through clutch 52. The leading edge of the paper advances to a register stop switch 70 in machine 10 which closes the switch and de-energizes feed roll pair 42,44. Motor 50 continues to advance the paper causing buckle 60 to form. The early stage of buckle formation is represented by a dotted line. When buckle 60 is large enough to mechanically contact and close switch 62, represented by the solid line, a signal is sent to motor 50 deenergizing the motor. At this point the document registration is complete and the system controller in machine 10 will control the timing of the operation of the xerographic stations. The machine controller is conventional in the art and its operation is described in U.S. Pat. No. 5,257,567 whose contents are hereby incorporated by reference. The feed rolls 42,44 are energized and begin to advance the paper reducing the size of buckle 60 and opening the switch 62. Motor 50 is again energized and begins feeding paper from roll 15 at a slightly faster rate than the paper feed through rollers 42,44. Some minimum size of buckle 60 must be maintained through either system timing or hysteresis design of switch 62 to enable the cutter to cut while stationary; e.g. the prior art on the fly cutting operation is not required, considerably relaxing the operating requirements. The paper is fed until the length of the sheet material fed to cutter 16 equals the length preprogrammed for processing. Simultaneously a signal is sent to motor 50 reversing the motor operation. The feed roll 15 operation is stopped and the cutter 16 is energized via clutch 54. The trail edge of the sheet is cut at this time by the cutter. At the end of the cut, the motor again reverses and begins to drive feed rolls 32,34 to advance the next sheet to the registration position. The machine drive rolls are energized and move the cut sheet into the transfer station while advancing the next sheet into the registration station.

During the operational cycle described above, a buckle 60 continues to form because of the faster rotation of the supply speed rollers 32,34 relative to the machine speed. It was assumed that the document length was short enough so that the buckle would not grow large enough to close switch 62 more than once. However, for longer documents, switch 62 may be activated and deactivated two or more times depending on document length.

In one example, paper is advanced through the machine at 2.0 in./sec. while being driven from the supply roll at 2.1 in./sec. The cutter is driven at a rotational speed of 35 rpms which is substantially slower than on the fly systems of the prior art. The slower speed allows for a large gear reduction and enables a relatively small drive motor. A buckle size of approximately 1 inch is required for the cutter to cut before the paper goes taut. This is obtained by overdriving to the buckle switch when the lead edge stops for registration.

The embodiment described with respect to FIGS. 1–3 is an exemplary embodiment because of its simplicity. It is easily mechanically connected to an existing machine and self-contains all of the logic required to operate the paper feed and sheet cutter. The invention can also be practiced in the context of the sheet roll and cutter assembly being mechanically and electrically connected to the reproduction machine 10 with its operation controlled by the same logic which controls machine operation in the reproduction machine. For example, the invention can be used in the large document reproduction system disclosed in U.S. Pat. No. 5,257,567 to replace the 3 roll system described therein. For this embodiment, the sheet length information will be programmed in by the operator using control panel 18 (FIG. 1) and the machine controller will store the information in memory and adjust system timing to control the operation of motor 50.

While the embodiments disclosed herein are preferred, it will be appreciated from this teaching that various alternative, modifications, variations or improvements therein may be made by those skilled in the art, which are intended to be encompassed by the following claims:

What is claimed is:

1. A document reproduction machine of the type having a moving photoreceptive surface; a charging station for placing a charge on the photoreceptive surface; an exposure station for forming an electrostatic latent image on the photoreceptive surface; a developing station for developing the electrostatic latent image with toner particles; a transfer station for transferring the developed image to a copy sheet; and a fusing station for fusing the developed image onto a sheet media, wherein the fusing station includes an input system for advancing sheet media at a first rate, said document reproduction machine further including a sheet cutter, comprised of:

a bi-directional drive motor;

a motor driven feed roller for advancing sheet media toward the input system;

a roller clutch for selectively engaging said feed roller to said drive motor;

a buckle sensor for sensing a minimum size buckle in the sheet media;

a motor driven sheet cutter disposed between said feed roller and said input system, said sheet cutter for cutting the sheet media when said sheet cutter is driven by a motor;

a sheet cutter clutch for selectively engaging said sheet cutter to said drive motor; and a sheet media length circuit for generating a cut signal when a predetermined length of sheet media has advanced from said feed roller;

wherein said sheet cutter clutch engages said sheet cutter to said drive motor upon the occurrence of a cut signal;

wherein said roller clutch engages said feed roller to said drive motor when said buckle sensor does not sense a minimum size buckle;

wherein said sheet media advances toward the input system at a second rate which is greater than said first rate when said feed roller is driven by said drive motor, whereby an expanding buckle is formed in the sheet media;

wherein said bi-directional drive motor rotates in a first direction when said sheet cutter clutch is engaged; and wherein said bi-directional drive motor rotates in a second direction when said roller clutch is engaged.

2. The document reproduction machine according to claim 1, wherein said bi-directional drive motor stops advancing the sheet media after the buckle expands to a predetermined size.

* * * * *